(12) United States Patent
Buzzard et al.

(10) Patent No.: US 8,657,338 B2
(45) Date of Patent: Feb. 25, 2014

(54) POSITION LOCK FOR STEERING COLUMN

(75) Inventors: Donald A. Buzzard, Saginaw, MI (US);
Melvin L. Tinnin, Clio, MI (US);
Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/537,788

(22) Filed: Jun. 29, 2012

(65) Prior Publication Data
US 2014/0000325 A1 Jan. 2, 2014

(51) Int. Cl.
*B62D 1/184* (2006.01)
(52) U.S. Cl.
USPC .............................. 280/775; 74/493
(58) Field of Classification Search
USPC .............................. 280/775, 777; 74/492, 493
See application file for complete search history.

(56) References Cited

U.S. PATENT DOCUMENTS

| 6,139,057 A * | 10/2000 | Olgren et al. ................. 280/775 |
| 6,659,504 B2 * | 12/2003 | Riefe et al. ..................... 280/777 |
| 6,761,376 B2 * | 7/2004 | Riefe et al. ..................... 280/777 |
| 7,484,430 B2 * | 2/2009 | Schulz ............................ 74/493 |
| 7,574,941 B2 * | 8/2009 | Manwaring et al. ............. 74/492 |
| 7,735,868 B2 * | 6/2010 | Ridgway et al. ............... 280/775 |
| 8,047,096 B2 * | 11/2011 | Ridgway et al. ................ 74/493 |
| 2012/0125139 A1 * | 5/2012 | Tinnin et al. .................... 74/493 |

* cited by examiner

*Primary Examiner* — Paul N Dickson
*Assistant Examiner* — Timothy Wilhelm
(74) *Attorney, Agent, or Firm* — Cantor Colburn LLP

(57) ABSTRACT

A lock for a steering column comprises a bracket disposed along a raking direction. A control shaft is supported for translation with the steering column. A tooth lock is disposed on the control shaft and comprises a lever and an actuator. The actuator is configured to cause the lever to rotate in an adjustment direction when a force is applied in the adjustment direction and so as to apply a locking moment to the lever when a force is applied in the locking direction. The bracket has a teeth disposed along the raking direction. The lever is configured for engaging, upon rotation in the locking direction, at least one tooth so as to resist translation in the raking direction. The lever is configured for disengaging, upon rotation in the adjustment direction, from the at least one tooth so as to selectively facilitate translation in the raking direction.

20 Claims, 3 Drawing Sheets

US 8,657,338 B2

POSITION LOCK FOR STEERING COLUMN

BACKGROUND OF THE INVENTION

The present invention relates generally to locking adjustment mechanisms for steering columns and more specifically to systems and methods for selectively fixing a position of a steering column assembly or facilitating adjustment of a steering column assembly in at least a raking direction.

Traditional locks for steering columns often provide inadequate load handling capabilities for preventing upward steering column displacements in the event of a vehicle collision. Some prior attempts to address this issue have sought use of interlocking teeth to provide the required vertical stability. Unfortunately, however, many configurations that employ interlocking teeth to provide for a positive lock, while providing for selective engagement and disengagement of the teeth for alternating adjustment and locking of the steering column, encounter practical difficulties. For example, one source of dissatisfaction with such locking mechanisms is that the need to interlock the teeth of one component with the teeth of another may limit the available lock positions to a predefined finite set of positions. This issue provides a motivation toward decreasing the size of each of the teeth so as to decrease the incremental difference from one position to the next, providing for finer adjustments. Unfortunately, smaller teeth can result in decreased position assurance and loss of tactile sensations normally associated with the failure to securely seat the interlocking teeth.

Other proposed solutions involve the use of frictions locks, which may provide more fine adjustments, but may sacrifice reliability, being susceptible to unintended releases (e.g., sliding adjustments, creep) under some loads.

Accordingly, it is desirable to have a system and method for selectively fixing and adjusting a position of a steering column with improved fineness in the availability of adjustment positions and with improved reliability and security.

SUMMARY OF THE INVENTION

In a first aspect, an exemplary position lock for selectively resisting or facilitating raking movement of a steering column of a vehicle comprises a rake bracket fixed to the vehicle and disposed adjacent to the steering column along a raking direction of the steering column. A rake lock control shaft is supported for translation with the steering column and for rotation about a control shaft longitudinal axis. A tooth lock assembly is disposed on the rake lock control shaft for rotation about the control shaft longitudinal axis, and the tooth lock assembly comprises a tooth lock lever and a tooth lock actuator. The rake lock control shaft has at least one cross-sectional eccentricity for contacting the tooth lock actuator upon rotation of the rake lock control shaft. The tooth lock actuator is positioned for mechanical contact with the cross-sectional eccentricity and configured so as to cause the tooth lock lever to rotate in an adjustment direction when a force is applied to the tooth lock actuator in the adjustment direction and so as to apply a locking moment to the tooth lock lever when a force is applied to the tooth lock actuator in the locking direction.

The rake bracket has a rake lock tooth wall disposed along the raking direction and defining a plurality of rake lock teeth along the rake lock tooth wall. The tooth lock lever is configured for engaging, upon rotation in the locking direction, at least one tooth of the plurality of rake lock teeth so as to selectively resist translation of the tooth lock assembly, the rake lock control shaft, and the steering column in the raking direction. The tooth lock lever is configured for disengaging, upon rotation in the adjustment direction, from the at least one tooth of the plurality of rake lock teeth so as to selectively facilitate translation of the tooth lock assembly, the rake lock control shaft, and the steering column in the raking direction.

In a further aspect, a method for selectively resisting or facilitating raking movement of a steering column of a vehicle comprises fixing a rake bracket to the vehicle adjacent to the steering column along a raking direction of the steering column, with the rake bracket having a rake lock tooth wall disposed along the raking direction and defining a plurality of rake lock teeth along the rake lock tooth wall. A rake lock control shaft is supported for translation with the steering column and for rotation about a control shaft longitudinal axis. A tooth lock assembly is disposed on the rake lock control shaft for rotation about the control shaft longitudinal axis, with the tooth lock assembly comprising a tooth lock lever and a tooth lock actuator, and with the rake lock control shaft having at least one cross-sectional eccentricity for contacting the tooth lock actuator upon rotation of the rake lock control shaft.

The tooth lock actuator is positioned for mechanical contact with the cross-sectional eccentricity, and the tooth lock actuator is configured so as to cause the tooth lock lever to rotate in an adjustment direction when a force is applied to the tooth lock actuator in the adjustment direction and so as to apply a locking moment to the tooth lock lever when a force is applied to the tooth lock actuator in the locking direction. The tooth lock lever is configured for engaging, upon rotation in the locking direction, at least one tooth of the plurality of rake lock teeth so as to selectively resist translation of the tooth lock assembly, the rake lock control shaft, and the steering column in the raking direction. The tooth lock lever is also configured for disengaging, upon rotation in the adjustment direction, from the at least one tooth of the plurality of rake lock teeth so as to selectively facilitate translation of the tooth lock assembly, the rake lock control shaft, and the steering column in the raking direction.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
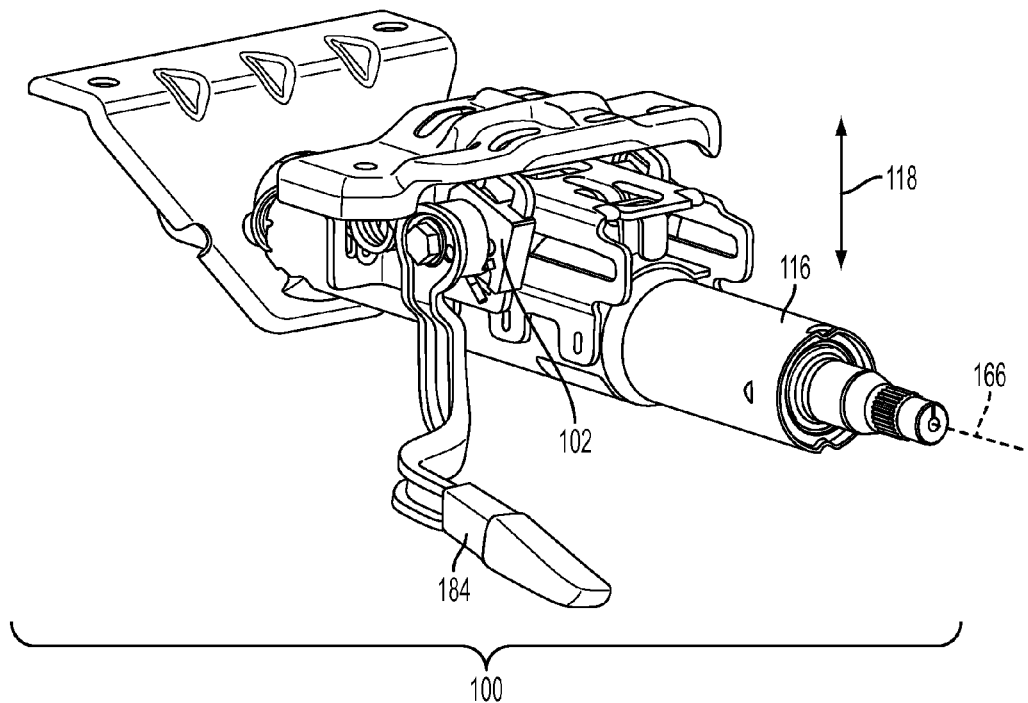
FIG. 1 illustrates a perspective view of an exemplary steering column assembly.

Referring now to the Figures, where the invention will be described with reference to specific embodiments, without limiting same, FIG. 1 illustrates an exemplary steering column assembly 100. As shown in FIG. 1, an exemplary steering column assembly 100 of a vehicle (not shown) comprises a steering column lock arm 184 coupled to a position lock 102, which is configured for selectively resisting or facilitating raking movement of a steering column 116 in response to movements of the steering column lock arm 184 and within an adjustment range that is defined by a position lock 102.

When the steering column lock arm 184 is positioned so as to place the position lock 102 in a locked mode, the steering column 116 is inhibited from being adjusted in a raking direction 118. Accordingly, the steering column 116 is relatively fixed, positionally, with respect to the vehicle. When the steering column lock arm 184 is positioned so as to place the position lock 102 in an adjustment mode, adjustments to the positioning of the steering column 116 are facilitated. Accordingly, the steering column 116 may be positionally adjusted (at least in a raking direction 118) relative to the vehicle. Once the steering column 116 occupies a desirable position, the steering column lock arm 184 may be re-positioned so as to return the position lock 102 to the locked mode. Accordingly, position lock 102 provides a system for selectively resisting or facilitating raking adjustment of the steering column 116.

Figure 2:
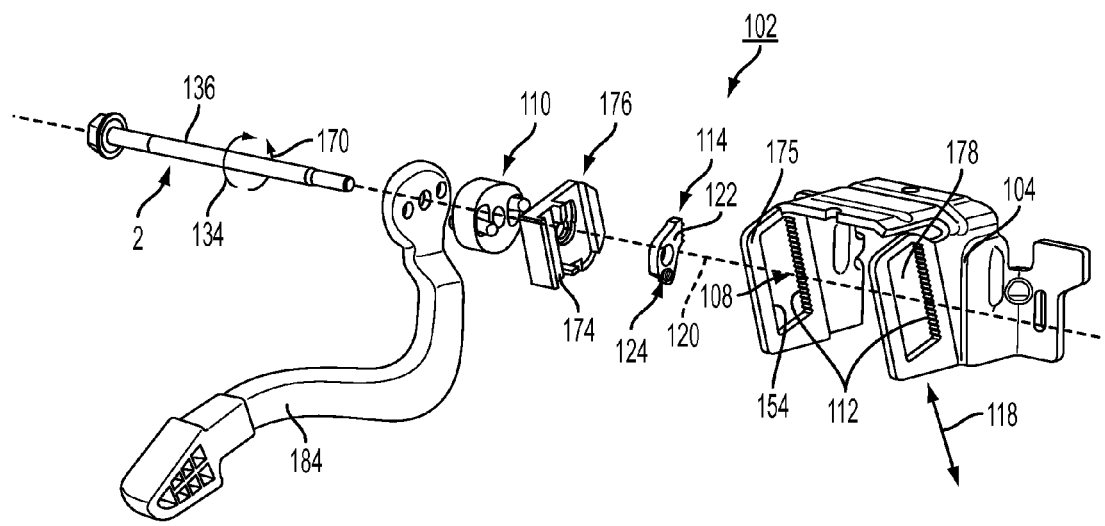
FIG. 2 illustrates an exploded perspective view of an exemplary position lock for a steering column.

FIG. 2 shows an exploded view of an exemplary position lock 102. As shown in FIG. 2, in an exemplary embodiment, a position lock 102 includes a rake bracket 104. In an exemplary embodiment, the rake bracket 104 is fixed to a structure of the vehicle (not shown) and disposed adjacent to the steering column 116 (FIG. 1), along a raking direction 118 (FIG. 1) of the steering column 116 (FIG. 1). As shown in FIG. 2, an exemplary rake bracket 104 has a rake lock tooth wall 108 that is disposed along the raking direction 118, that bounds a control slot 178, and that defines a plurality of rake lock teeth 112. The rake lock tooth wall 108, with its plurality of rake lock teeth 112, provides a stationary structure against which a cooperating member may be engaged so as to lock the cooperating member to the stationary structure. The tooth lock assembly 114 is configured for selectively engaging and disengaging from the rake lock tooth wall 108 and the plurality of rake lock teeth 112 upon rotation of the tooth lock assembly 114 so as to selectively resist or facilitate translation of the tooth lock assembly 114 in the raking direction 118.

Figure 3:
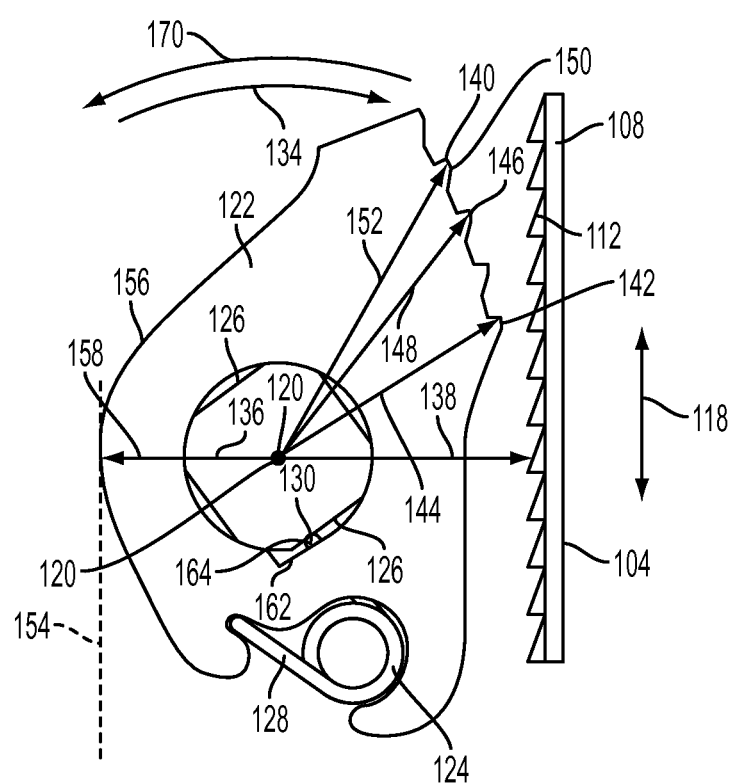
FIG. 3 illustrates a side view of a portion of an exemplary position lock for a steering column.

In an exemplary embodiment, the tooth lock assembly 114 comprises a tooth lock lever 122 and a tooth lock actuator 124 and is supported for rotation about a tooth lock rotation axis 120. In an exemplary embodiment, the tooth lock assembly 114 is disposed on the rake lock control shaft 136 for rotation about the longitudinal axis of a rake lock control shaft 136. The rake lock control shaft 136 is supported for rotation about its longitudinal axis and is coupled to the steering column lock arm 184 so that steering column lock arm 184 may facilitate application of a torque upon the rake lock control shaft 136 in either a locking direction 134 (FIG. 3) or an adjustment direction 170 (FIG. 3). In an exemplary embodiment, a cam 110 operates in conjunction with the steering column lock arm 184 so as to limit the absolute range of rotation of the rake lock control shaft 136 so as to prevent application of excessive loads upon the tooth lock assembly 114 or other components of the position lock 102.

In an exemplary embodiment, as shown in FIG. 3, the rake lock control shaft 136 has an outer surface that defines at least one cross-sectional eccentricity (i.e., a non-circular cross-sectional shape such as having a flat side or a square cross-section or an oval-shaped cross-section) 126 for contacting a control member 164 of the tooth lock actuator 124 upon rotation of the rake lock control shaft 136. The control member 164 of the tooth lock actuator 124 is positioned for mechanical contact with the cross-sectional eccentricity 126 of the rake lock control shaft 136 and is configured so as to cause the tooth lock lever 122 to rotate in an adjustment direction 170 when a force is applied to the control member 164 in the adjustment direction 170. The tooth lock actuator 124 is configured and arranged so as to apply a locking moment (i.e., a moment in the locking direction 134) to the tooth lock lever 122 when a force is applied to the control member 164 in the locking direction 134.

In an exemplary embodiment, the tooth lock actuator 124 comprises a spring having a first end 128 disposed for applying a locking moment (i.e., a moment or torque directed toward the locking direction 134) to the tooth lock lever 122 and a second end 130 that defines the control member 164. The control member 164 is disposed for contact with the cross-sectional eccentricity 126 defined by the outer surface of the rake lock control shaft 136.

Figure 4:
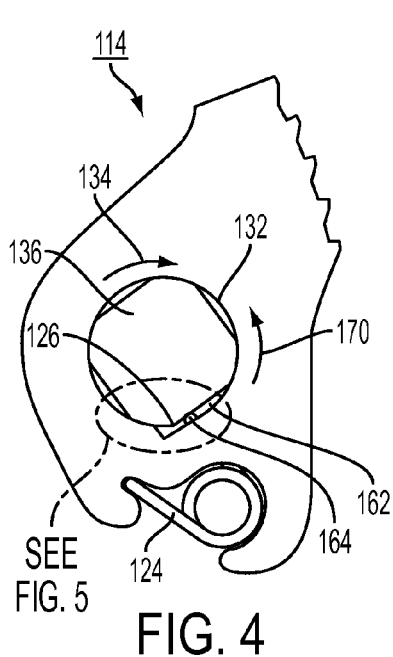
FIG. 4 illustrates a side view of a portion of an exemplary position lock for a steering column.
Figure 5:
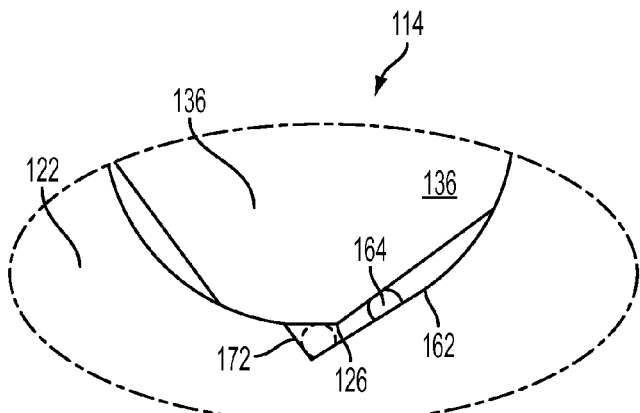
FIG. 5 illustrates an enlarged side view of a portion of an exemplary position lock for a steering column.

FIG. 4 and FIG. 5 show portions of an exemplary tooth lock assembly 114. In accordance with this embodiment, as the rake lock control shaft 136 is rotated in the locking direction 134, if there is an impediment to the rotation of the tooth lock assembly 114 along with the rake lock control shaft 136 (e.g., contact between the tooth lock assembly 114 and the rake bracket 104), then the tooth lock actuator 124 may deform as the control member 164 moves along the relief ramp 162 until the control member 164 is positioned in a position such as in the ramp corner 172, which is configured to allow the rake lock control shaft 136 to bypass the control member 164 and continue rotating in the locking direction 134 relatively to the tooth lock lever 122. In alternative embodiments, there may be no ramp corner 172 provided, or the control member 164 may otherwise be prevented from occupying a position such as in the ramp corner, whereby the rake lock control shaft 136 is therefore not permitted to bypass the control member 164 even as torque is applied in the locking direction 134. If the rake lock control shaft 136 is rotated in the adjustment direction 170, the rake lock control shaft 136 binds against the control member 164, causing the interface between the rake lock control shaft 136, the control member 164 and the tooth lock lever 122 to become a solid, back-driving unitary group.

The tooth lock lever 122 defines a substantially circular interior control shaft passage 132 having a nominal radius sized to accommodate the rake lock control shaft 136. At a location along a wall of the interior control shaft passage 132, a relief ramp 162 is defined. The relief ramp 162 is configured for accepting the control member 164 at a ramp corner 172 so as to allow the cross sectional eccentricity 126 to bypass the control member 164 when the control member 164 resides in the ramp corner 172. As the rake lock control shaft 136 rotates in the locking direction 134, the cross-sectional eccentricity 126 forces the control member 164 along the relief ramp 162 toward the ramp corner 172, deforming the tooth lock actuator 124 in the process, and increasing the locking moment applied by the tooth lock actuator 124 upon the tooth lock lever 122. In an exemplary embodiment, the relief ramp is shaped such that the interior control shaft passage 132 at the location of the relief ramp 162 has a gradually increasing radius, increasing to the ramp corner 172 wherein the control member 164 can reside while the rake lock control shaft 136 is able to freely rotate past the control member 164 within the interior control shaft passage 132 without binding tooth lock lever 122.

Accordingly, the tooth lock assembly 114 is configured so as to respond to rotation of the rake lock control shaft 136 in the locking direction 134 by also rotating in the locking direction 134, but only until the tooth lock assembly 114 contacts the rake lock tooth wall 108. Beyond this point, further rotation of the rake lock control shaft 136 in the locking direction 134 results in deformation of the tooth lock actuator 124 corresponding to movement of the control member 164 along the relief ramp 162. As the rake lock control shaft 136 continues to rotate in the locking direction 134, the tooth lock actuator 124 continues to deform, and the locking moment imposed by the tooth lock actuator 124 upon the tooth lock lever 122 continues to increase. When the tooth lock actuator 124 has deformed sufficiently that the control member 164 reaches the ramp corner 172, the rake lock control shaft 136 may continue to rotate in the locking direction 134 even though the tooth lock lever 122 remains fixed and the tooth lock actuator 124 does not deform further. It should be appreciated that the tooth lock lever 122 may be configured such that its center of gravity is disposed a distance from its axis of rotation so that, as the vehicle encounters a deceleration, the inertia of the tooth lock lever 122 imposes a moment on the tooth lock lever 122 tending to bias the tooth lock lever 122 in the locking direction 134.

Figure 6:
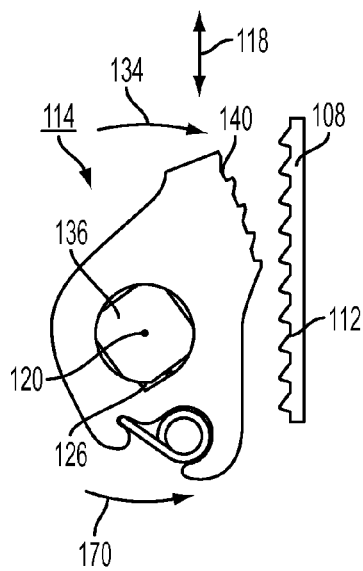
FIG. 6 illustrates a side view of a portion of an exemplary position lock in an adjustment mode.

The relief ramp 162 is also configured for binding the control member 164 between the cross-sectional eccentricity 126 and the inner surface of the tooth lock lever 122 upon a deformation of the tooth lock actuator 124 corresponding to rotation of the rake lock control shaft 136 in the adjustment direction 170. In an exemplary embodiment, the control member 164 is biased so as to tend toward a position along the relief ramp wherein the radius is insufficient to permit the eccentricity of the rake lock control shaft 136 to pass without causing the control member 164 to bind between the eccentricity and the interior control shaft passage 132. Accordingly, rotation of the rake lock control shaft 136 in the adjustment direction allows the control member 164 to return to a position along the relief ramp 162 where the rake lock control shaft 136 cannot be rotated in the adjustment direction without also causing the tooth lock lever 122 to also rotate in the adjustment direction. As a result, as shown in FIG. 6, rotation of the rake lock control shaft 136 in the adjustment direction is sufficient to cause the toothed peripheral edge 140 on tooth lock assembly 114 to disengage from the plurality of rake lock teeth 112 on rake bracket 104, thereby facilitating adjustment of the steering column 116 in the raking direction 118.

A tooth lock cartridge 176 (FIG. 2) may be used in connection with the cam 110 to limit the absolute range of rotation of the rake lock control shaft 136. In addition, the tooth lock cartridge 176 may be used along with the rake bracket 104 to define the range of translational motion of the rake lock control shaft 136 as well as that of the tooth lock assembly 114.

In an exemplary embodiment, the rake lock control shaft 136 is supported for translation with the steering column 116. Put another way, the rake lock control shaft 136 is translationally fixed to both the steering column 116 and the tooth lock assembly 114 such that when the steering column 116 undergoes raking movement, the rake lock control shaft 136 and the tooth lock assembly 114 also undergo raking movement. Accordingly, when the tooth lock assembly 114 is prevented from undergoing raking movement, the rake lock control shaft 136 and the steering column 116 are also prevented from undergoing raking movement. In an exemplary embodiment, the tooth lock assembly 114 is coupled to the steering column 116 for movement with the steering column 116 in a raking direction 118.

FIG. 3, FIG. 4, FIG. 6, FIG. 7, and FIG. 8 show side views of portions of an exemplary position lock 102 in various stages of operation. The tooth lock assembly 114 is disposed on the rake lock control shaft 136 for rotation about the rake lock control shaft 136. In operation, as the rake lock control shaft 136 is rotated in the locking direction 134, surface 126 of the rake lock control shaft 136 contacts the control member 164 so as to cause the tooth lock assembly 114 to rotate until at least one tooth of the tooth lock lever 122 contacts the wall 108.

After initial contact between the tooth lock lever 122 and the wall 108 of the rake bracket 104, the tooth lock actuator 124 deforms, until the control member 164 resides in the ramp corner 172, thereby allowing the rake lock control shaft 136 to continue rotating while the tooth lock lever 122 occupies a locked position. For a range of further rotation of the rake lock control shaft 136 in the locking direction, the tooth lock lever 122 remains positioned in contact with the rake bracket 104, biased toward the locking direction by the tooth lock actuator 124. When the tooth lock lever 122 is in this locked position, the tooth lock lever 122 prevents the rake lock control shaft 136 from moving in the vertical direction relative to the rake bracket 104.

In an exemplary embodiment, when the toothed peripheral edge 140 on the tooth lock assembly 114 contacts the plurality of rake lock teeth 112 on the rake bracket 104, further rotation of the 122 may be impeded by contact between the wall 108 and the rake lock lever 122. Accordingly, tension may be developed in the tooth lock actuator 124, such that it deforms and the control member 164 proceeds toward the ramp corner 172. As the tooth lock actuator 124 deforms, the additional spring tension developed tends to urge the 122 into further contact with the wall (i.e., tending to bias the tooth lock assembly 114 toward engagement of additional teeth). When the tooth lock actuator 124 has deformed sufficiently that the control member 164 is positioned in the ramp corner 172, sufficient clearance will exist that the rake lock control shaft 136 may rotate further in the locking direction even though the lever 122 does not rotate further, instead remaining in a fixed position with its toothed peripheral edge in locking engagement with the wall. It should be appreciated that a position lock 102 such as described herein may be implemented on one or both sides of a steering column 116.

In an exemplary embodiment, the tooth lock assembly 114 is disposed so as to define a tooth lock working distance 138 between the rake lock tooth wall 108 and the tooth lock rotation axis 120. The tooth lock lever 122 of the tooth lock assembly 114 defines a toothed peripheral edge 140 proximate the rake lock tooth wall 108. A first tooth 142 on the toothed peripheral edge 140 is disposed at a first tooth distance 144 from the tooth lock rotation axis 120. The first tooth distance 144 is greater than the tooth lock working distance 138. A second tooth 146 on the toothed peripheral edge 140 is disposed at a second tooth distance 148 from the tooth lock rotation axis 120. The second tooth distance 148 is greater than the first tooth distance 144. A third tooth 150 on the toothed peripheral edge 140 is disposed at a third tooth distance 152 from the tooth lock rotation axis 120. The third tooth distance 152 is greater than the second tooth distance 148.

Figure 7:
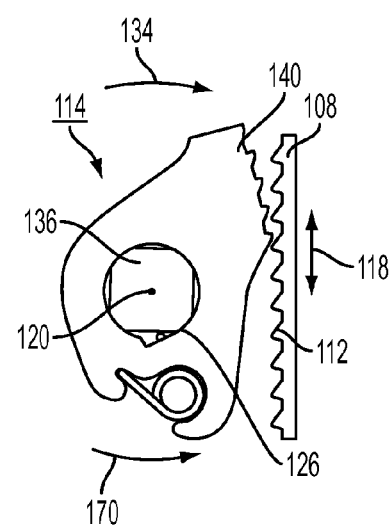
FIG. 7 illustrates a side view of a portion of an exemplary position lock in a partially locked mode.
Figure 8:
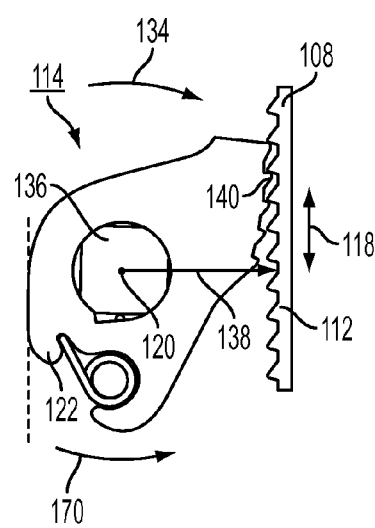
FIG. 8 illustrates a side view of a portion of an exemplary position lock in a fully-engaged, locked mode.

FIG. 7 and FIG. 8 illustrate portions of an exemplary position lock 102 in a locked mode. As shown in FIG. 7, the tooth lock lever 122 of the tooth lock assembly 114 is configured for engaging, upon rotation in the locking direction 134, at least one tooth of the plurality of rake lock teeth 112 so as to selectively resist translation of the tooth lock assembly 114, the rake lock control shaft 136, and the steering column 116 in the raking direction 118. As shown in FIG. 7 and FIG. 8, once the first tooth 142 is engaged with a mating tooth of the plurality of rake lock teeth 112 on the tooth lock wall 108, further urging of the center of the tooth lock 114 in the raking direction 118 coupled with the interlocking engagement of the first tooth 142 with the mating tooth, imposes a moment on the tooth lock 114 in the locking direction 134. This moment, coupled with the increasing tooth distances 148, 152 associated with the second and third teeth 146, 150, relative to the tooth distance 144, tends to force the tooth lock 114 into further, and more secure, engagement with the rake lock tooth wall 108.

It should be appreciated that, as the tooth lock 114 is urged toward further engagement with the rake lock tooth wall 108, the tooth lock rotation axis 120 may be urged to reside at a position that is further from the rake lock tooth wall 108 than when only the first tooth 142 is in engagement. Accordingly, the rotation of the tooth lock 114 may tend to urge an increase in the tooth lock working distance 138. To oppose such movements to the tooth lock rotation axis 120 or to the tooth lock working distance 138, a stabilizer may be implemented in the static structure adjacent to the tooth lock lever 122 so as to cooperate with the tooth lock 114 in resisting or limiting such movements. For example, in an exemplary embodiment, a tooth lock cartridge 176 may be configured to provide one or more abutments positioned so as to resist or limit such movements of the tooth lock lever 122. Similarly, an abutment may be positioned adjacent to the rake lock control shaft 136 so as to resist or limit excessive deflection in the rake lock control shaft 136. In configurations wherein the tooth lock lever 122 is coupled to the rake lock control shaft 136, movements in the tooth lock lever 122 can be resisted.

Still further, the rake lock bracket 104 may provide a backstopping mechanism to resist or limit such movements of the tooth lock 114. In an exemplary embodiment, the rake bracket 104 has a stabilizing wall 154 (FIG. 2) disposed substantially parallel to the rake lock tooth wall 108. The stabilizing wall 154 (or other abutment feature) is configured to facilitate sliding contact with a substantially smooth peripheral edge 156 defined by the tooth lock lever 122. The tooth lock rotation axis 120 is disposed a distance from the stabilizing wall 154 so as to define a stabilizing distance 158. The tooth lock lever 122 is configured for engaging the stabilizing wall 154 so as to resist or prevent undesirable changes in the tooth lock working distance 138, and this may be accomplished by maintaining a desirable stabilizing distance 158.

The tooth lock lever 122 defines the substantially smooth peripheral edge 156 proximate the stabilizing wall 154 (or other abutment feature). The peripheral edge 156 is disposed at a desirable (e.g., substantially constant, varying in a manner that is complementary to the profile of the toothed peripheral edge) radial distance from the tooth lock rotation axis 120. By setting an appropriate profile for the radial distance (e.g., being approximately equal to the stabilizing distance 158, etc.), the interaction of the peripheral edge 156 and the stabilizing wall 154 or other abutment feature (or the interaction of the rake lock control shaft 136 with an abutment feature) may assist in resisting or limiting undesirable movements of the tooth lock lever 122 and the rake lock control shaft 136.

In an exemplary embodiment, the rake lock control shaft 136 is arranged substantially transversely to the raking direction 118, each tooth of the plurality of rake lock teeth 112 is oriented substantially transversely to the raking direction 118, and each tooth of the plurality of rake lock teeth 112 is disposed substantially transversely to a longitudinal axis 166 defined by the steering column 116. In an exemplary embodiment, the raking direction 118 is substantially transverse to a longitudinal axis 166 defined by the steering column 116. In an exemplary embodiment, the rake lock control shaft 136 is arranged substantially transversely to a longitudinal axis 166 of the steering column 116. In an exemplary embodiment, the raking direction 118 is substantially vertical.

In an exemplary embodiment, the rake bracket 104 provides a guide structure 175 on which a tooth lock cartridge 176 may ride. The tooth lock cartridge 176 has a guide pocket 174 that cooperates with the guide structure 175 so as to maintain the position of the tooth lock rotation axis 120 and the longitudinal axis of the rake lock control.

Thus, the present invention provides a locking mechanism that avoids many of the problems inherent in existing systems. In accordance with an exemplary embodiment of the invention locking teeth are configured so as to roll or rotate into engagement such that the locking engagement of the teeth becomes tighter and more secure as forces to overcome the locking engagement are applied. The disclosed driver configuration enables decoupling of the actuation lever from the locking device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A position lock for selectively resisting or facilitating raking movement of a steering column of a vehicle, the position lock comprising:

a rake bracket fixed to the vehicle and disposed adjacent to the steering column along a raking direction of the steering column;

a rake lock control shaft supported for translation with the steering column and for rotation about a control shaft longitudinal axis; and a tooth lock assembly disposed on the rake lock control shaft for rotation about the control shaft longitudinal axis;

the tooth lock assembly comprising a tooth lock lever and a tooth lock actuator;

the rake lock control shaft having at least one cross-sectional eccentricity for contacting the tooth lock actuator upon rotation of the rake lock control shaft;

the tooth lock actuator positioned for mechanical contact with the cross-sectional eccentricity and configured so as to cause the tooth lock lever to rotate in an adjustment direction when a force is applied to the tooth lock actuator in the adjustment direction and so as to apply a locking moment to the tooth lock lever when a force is applied to the tooth lock actuator in the locking direction;

the rake bracket having a rake lock tooth wall disposed along the raking direction and defining a plurality of rake lock teeth along the rake lock tooth wall;

the tooth lock lever configured for engaging, upon rotation in the locking direction, at least one tooth of the plurality of rake lock teeth so as to selectively resist translation of the tooth lock assembly, the rake lock control shaft, and the steering column in the raking direction;

the tooth lock lever configured for disengaging, upon rotation in the adjustment direction, from the at least one tooth of the plurality of rake lock teeth so as to selectively facilitate translation of the tooth lock assembly, the rake lock control shaft, and the steering column in the raking direction;

wherein the tooth lock actuator comprises a spring having a first end disposed for applying a locking torque to the tooth lock lever and a second end defining a control member disposed for contact with the cross-sectional eccentricity;

wherein the tooth lock lever defines a substantially circular interior control shaft passage with a relief ramp; and wherein the relief ramp is configured for binding the control member between the cross-sectional eccentricity and the tooth lock lever upon a deformation of the spring corresponding to rotation of the rake lock control shaft in the adjustment direction.

2. A position lock as in claim 1:

wherein the tooth lock assembly is disposed so as to define a tooth lock working distance between the rake lock tooth wall and the control shaft longitudinal axis;

wherein the tooth lock lever defines a toothed peripheral edge proximate the rake lock tooth wall, a first tooth on the toothed peripheral edge being disposed at a first tooth distance from the control shaft longitudinal axis; and wherein the first tooth distance is greater than the tooth lock working distance.

3. A position lock as in claim 2:

wherein a second tooth on the toothed peripheral edge is disposed at a second tooth distance from the control shaft longitudinal axis; and wherein the second tooth distance is greater than the first tooth distance.

4. A position lock as in claim 3:

wherein a third tooth on the toothed peripheral edge is disposed at a third tooth distance from the control shaft longitudinal axis; and wherein the third tooth distance is greater than the second tooth distance.

5. A position lock as in claim 2:

wherein the rake bracket has a stabilizing wall disposed substantially parallel to the rake lock tooth wall;

wherein the stabilizing wall is configured to facilitate sliding contact with an edge of the tooth lock lever;

wherein the control shaft longitudinal axis is disposed a distance from the stabilizing wall so as to define a stabilizing distance; and wherein the tooth lock lever is configured for engaging the stabilizing wall so as to maintain as constant the tooth lock working distance.

6. A position lock as in claim 5:

wherein the tooth lock lever defines a substantially smooth peripheral edge proximate the stabilizing wall, wherein the peripheral edge is disposed a substantially constant radial distance from the control shaft longitudinal axis, and wherein the substantially constant radial distance is approximately equal to the stabilizing distance.

7. A position lock as in claim 1, wherein the rake-lock control shaft is arranged substantially transversely to said raking direction.

8. A position lock as in claim 1, wherein each tooth of said plurality of rake lock teeth is oriented substantially transversely to the raking direction.

9. A position lock as in claim 1, wherein each tooth of the plurality of rake lock teeth are disposed substantially transversely to a longitudinal axis defined by the steering column.

10. A position lock as in claim 1, wherein said raking direction is substantially transverse to a longitudinal axis defined by said steering column.

11. A position lock as in claim 1, wherein the rake-lock control shaft is arranged substantially transversely to a longitudinal axis of the steering column.

12. A position lock as in claim 1, wherein the relief ramp is configured for accepting the control member so as to allow the cross sectional eccentricity to bypass the control member upon a deformation of the spring corresponding to rotation of the rake lock control shaft in the locking direction.

13. A method for selectively resisting or facilitating raking movement of a steering column of a vehicle, the method comprising:

fixing a rake bracket to the vehicle adjacent to the steering column along a raking direction of the steering column, the rake bracket having a rake lock tooth wall disposed along the raking direction and defining a plurality of rake lock teeth along the rake lock tooth wall;

supporting a rake lock control shaft for translation with the steering column and for rotation about a control shaft longitudinal axis; and disposing a tooth lock assembly on the rake lock control shaft for rotation about the control shaft longitudinal axis, the tooth lock assembly comprising a tooth lock lever and a tooth lock actuator, and the rake lock control shaft having at least one cross-sectional eccentricity for contacting the tooth lock actuator upon rotation of the rake lock control shaft;

positioning the tooth lock actuator for mechanical contact with the cross-sectional eccentricity;

configuring the tooth lock actuator so as to cause the tooth lock lever to rotate in an adjustment direction when a force is applied to the tooth lock actuator in the adjustment direction and so as to apply a locking moment to the tooth lock lever when a force is applied to the tooth lock actuator in the locking direction;

configuring the tooth lock lever for engaging, upon rotation in the locking direction, at least one tooth of the plurality of rake lock teeth so as to selectively resist translation of the tooth lock assembly, the rake lock control shaft, and the steering column in the raking direction; and configuring the tooth lock lever for disengaging, upon rotation in the adjustment direction, from the at least one tooth of the plurality of rake lock teeth so as to selectively facilitate translation of the tooth lock assembly, the rake lock control shaft, and the steering column in the raking direction;

forming the tooth lock actuator from a spring having a first end disposed for applying a locking torque to the tooth lock lever and a second end defining a control member disposed for contact with the cross-sectional eccentricity;

configuring the tooth lock lever so as to define a substantially circular interior control shaft passage with a relief ramp;

configuring the relief ramp for accepting the control member so as to allow the cross sectional eccentricity to bypass the control member upon a deformation of the spring corresponding to rotation of the rake lock control shaft in the locking direction; and further configuring the relief ramp for binding the control member between the cross-sectional eccentricity and the tooth lock lever upon a deformation of the spring corresponding to rotation of the rake lock control shaft in the adjustment direction.

14. A method as in claim 13, further comprising:
arranging the rake-lock control shaft substantially transversely to a longitudinal axis of the steering column.

15. A method as in claim 13, further comprising:
configuring the relief ramp for accepting the control member so as to allow the cross sectional eccentricity to bypass the control member upon a deformation of the spring corresponding to rotation of the rake lock control shaft in the locking direction.

16. A method as in claim 13, further comprising:
disposing the tooth lock assembly so as to define a tooth lock working distance between the rake lock tooth wall and the control shaft longitudinal axis;
defining, with the tooth lock lever, a toothed peripheral edge proximate the rake lock tooth wall such that a first tooth on the toothed peripheral edge is disposed at a first tooth distance from the control shaft longitudinal axis, the first tooth distance being greater than the tooth lock working distance.

17. A method as in claim 16, further comprising:
disposing a stabilizing wall of the rake bracket substantially parallel to the rake lock tooth wall;
configuring the stabilizing wall to facilitate sliding contact with an edge of the tooth lock lever;
disposing the control shaft longitudinal axis a distance from the stabilizing wall so as to define a stabilizing distance; and
configuring the tooth lock lever for engaging the stabilizing wall so as to maintain as constant the tooth lock working distance.

18. A method as in claim 17:
defining, on the tooth lock lever, a substantially smooth peripheral edge proximate the stabilizing wall; and
disposing the peripheral edge a substantially constant radial distance from the control shaft longitudinal axis such that the substantially constant radial distance is approximately equal to the stabilizing distance.

19. A method as in claim 13, further comprising arranging the rake-lock control shaft substantially transversely to the raking direction.

20. A method as in claim 13, further comprising orienting each tooth of said plurality of rake lock teeth substantially transversely to the raking direction.

* * * * *